UNITED STATES PATENT OFFICE.

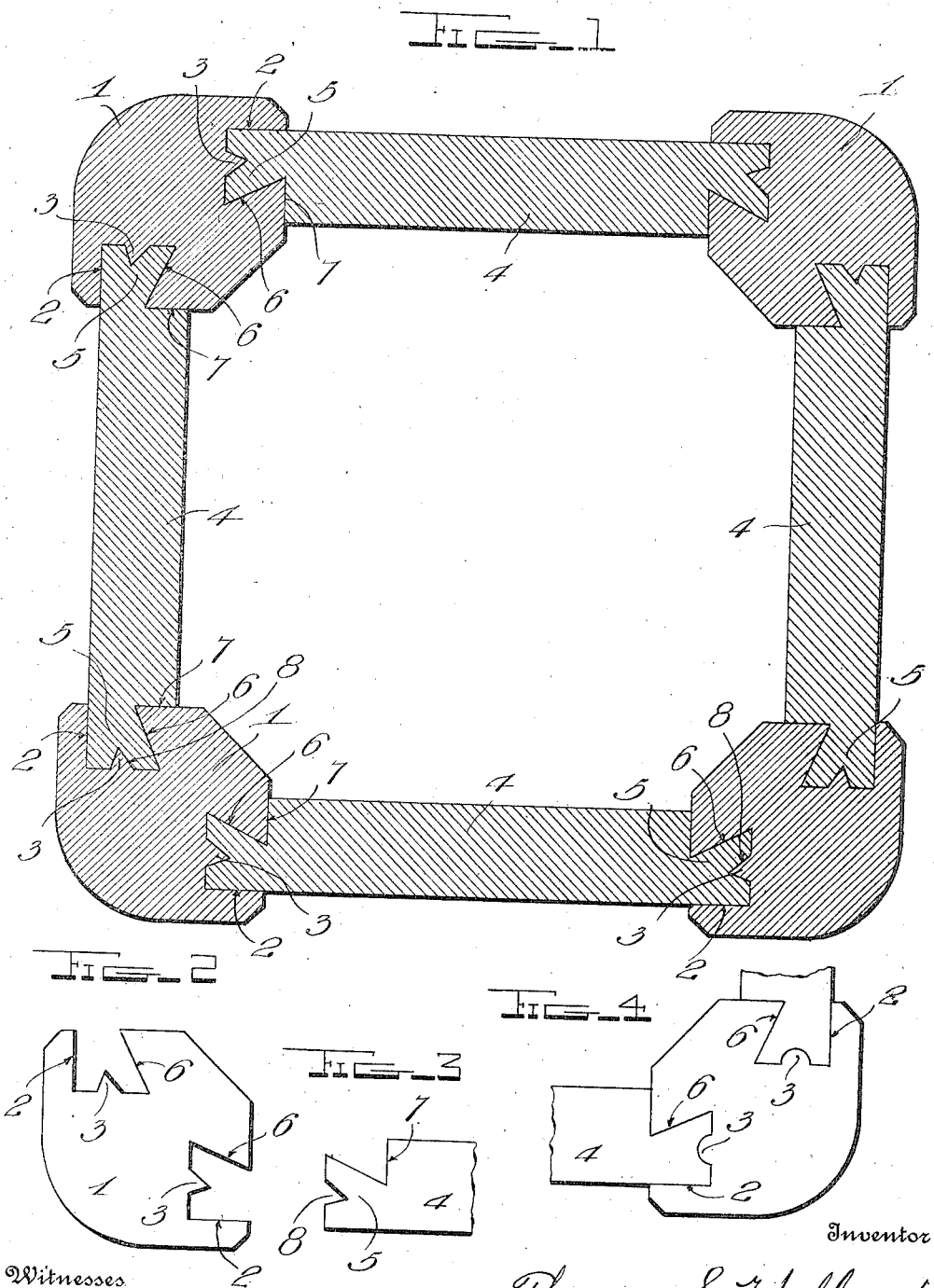

THOMAS S. HOLLAND, OF TACOMA, WASHINGTON.

INTERLOCKING JOINT.

1,032,674.  Specification of Letters Patent.  Patented July 16, 1912.

Application filed November 6, 1911. Serial No. 658,747.

*To all whom it may concern:*

Be it known that I, THOMAS S. HOLLAND, a citizen of the United States, residing at Tacoma, in the county of Pierce and State of Washington, have invented certain new and useful Improvements in Interlocking Joints, of which the following is a specification.

This invention relates to joints of a character particularly useful in joining parts constituting columns, but which are applicable in joining the parts, particularly of wood, of other structures where such parts are to be secured at angles to each other.

The primary object of the invention is to provide a joint of the character referred to, wherein the parts shall be so formed at their meeting edges as to prevent the breaking or splitting which usually result in the usual forms of joints.

A further object of the invention is to provide a joint of a form permitting the attachment of parts in a permanent manner without the use of nails, glue or other means for securing the parts together.

With these objects in view the invention consists essentially of a joint formed by providing one part to be joined with a groove or opening having extending into it a rib or elongated projection, extending substantially parallel to the outer face of the part, and by providing the other part to be joined with a tenon having therein a groove or way for receiving the rib or projection which extends into the groove or opening of the first part.

The invention consists further in various generic and specific details of construction and combinations of parts, substantially as hereinafter described and claimed.

The invention is illustrated in the accompanying drawing, in which:

Figure 1 is a horizontal sectional view of a rectangular structure having the parts thereof connected by my improved joints; Fig. 2 is a detail plan view of a part having therein a groove or opening; Fig. 3 is a view of a part having a tenon adapted to enter the groove or opening of the part shown in Fig. 2; and, Fig. 4 is a fragmentary view of a modified form of joint.

As shown the joint is formed by providing one part to be connected, as the portion 1, with one or more longitudinally disposed grooves 2, into the bottom of which extends a rib or projection 3 which may be angular as shown in Figs. 1 and 2 of the drawing or curved, as shown in Fig. 4. The rib or projection extends substantially parallel to the face of the part 1 and forms when the co-acting portion of another part to be joined is introduced into the groove or opening, an abutment to resist strains which would otherwise be imparted wholly upon the thin bodies of wood between the grooves or openings and the faces of the part 1. The other part 4 be connected has formed on its edge a tenon or tenons 5, having on its outer end face a groove or way of a form corresponding to the shape of the rib or projection of the part 1 and of a size to closely confine the rib or projection.

In order to adapt the joint for securing the parts together securely without the use of other means such as nails, screws, glue or the like, one side of the grooves 2 has an undercut 6, and the tenon at one side extends outward toward its end. Each part 4 has adjacent to the base of the tenon a shoulder 7 which when the parts are joined bears directly against the side of the part 1.

The parts formed as described are joined by introducing the tenon on the part 4 longitudinally into the groove 2 of the part 1, and in this way a firm joint preventing the separation of the parts without the use of extraneous means, and one which will be secure against splitting or breaking of the parts near the joint is effected.

Having thus described my invention, what I claim as new is:

A joint comprising one part to be joined, having an opening or groove parallel with the edge of the part, the groove having a rib or projection extending into it from the bottom wall, and a second part provided with a tenon having therein a groove or way of a size and shape to receive and confine the rib or projection.

In testimony whereof I affix my signature in presence of two witnesses.

THOMAS S. HOLLAND.

Witnesses:
W. H. VAN NUYS,
GEO. H. KING.